United States Patent [19]

Hager

[11] Patent Number: 4,549,746
[45] Date of Patent: Oct. 29, 1985

[54] VEHICLE COUPLING APPARATUS WITH SWAY DAMPENING

[76] Inventor: Clarence H. Hager, 3408 Corbridge La., Rockford, Ill. 61107

[21] Appl. No.: 661,657

[22] Filed: Oct. 17, 1984

[51] Int. Cl.⁴ ............................................. B60D 1/00
[52] U.S. Cl. ................ 280/446 B; 280/450; 280/455
[58] Field of Search .......... 280/406 A, 446 R, 446 B, 280/432, 450, 474, 455

[56] References Cited

U.S. PATENT DOCUMENTS

| | | | |
|---|---|---|---|
| 2,768,837 | 10/1956 | Prater | 280/446 B |
| 2,879,079 | 3/1959 | Edwards | 280/446 R |
| 2,898,126 | 8/1959 | Loukonen | 280/474 |
| 3,400,948 | 9/1968 | Matson | 280/446 B |
| 3,414,295 | 12/1968 | Rendessy | 280/511 |
| 3,519,287 | 7/1970 | Pontbriand | 280/446 R |
| 3,556,558 | 1/1971 | McKee | 280/446 R |
| 3,690,699 | 9/1972 | Derr, Jr. | 280/446 B |
| 3,801,133 | 4/1974 | Thompson | 280/446 B |
| 3,989,269 | 11/1976 | Rendessy | 280/446 B |
| 4,002,352 | 1/1977 | Hager | 280/408 |
| 4,157,190 | 6/1979 | Nyman | 280/512 |
| 4,317,252 | 3/1982 | Knowlton | 280/474 |

Primary Examiner—Joseph F. Peters, Jr.
Assistant Examiner—Charles R. Watts
Attorney, Agent, or Firm—Vernon J. Pillote

[57] ABSTRACT

A coupling apparatus for interconnecting two vehicles for relative pivotal movement including a hitch member adapted for attachment to one vehicle and having a ball hitch, and a coupler member adapted for attachment to a second vehicle and having a head for swivelly receiving the hitch ball. A slide block is mounted in a guide member on the hitch member for movement crosswise of the centerline of the hitch member and has a notch for receiving a nose on the coupler member so that angular movement of the coupler member about the axis of the hitch ball causes sliding movement of the slide block. Movement of the slide block along the guide is retarded by a frictional brake pad and a selectively operable lever is provided to retract the guide member and slide block away from the hitch ball to facilitate coupling and uncoupling.

13 Claims, 4 Drawing Figures

VEHICLE COUPLING APPARATUS WITH SWAY DAMPENING

BACKGROUND OF THE INVENTION

It is well known that trailers have a tendency to weave or sway, particularly when the towing vehicle is travelling at high speeds along a straight path, and that this problem is aggravated when a number of vehicles are interconnected in a train of vehicles. Various different vehicle couplings have heretofore been proposed for controlling swaying of the trailing vehicle. Some prior devices such as disclosed in U.S. Pat. Nos. 3,400,948; 3,414,295; 3,519,287 and 3,989,269 disclose friction type brake devices for retarding swaying movement in the towing and trailing vehicles. The friction type brake devices disclosed in the above patents apply a generally constant braking action throughout the entire range of relative movement between the towing and trailing vehicle. However, the forces resisting relative angular movement of the towing and trailing vehicles should be maximum when the vehicles are travelling along a straight line and decrease when the vehicles are turning to facilitate maneuvering the vehicles around turns. Some other vehicle couplings such as shown in U.S. Pat. Nos. 2,879,079 and 3,690,699, utilize a detent arrangement for controlling swaying. While such detent arrangements maximize the forces resisting swaying when the vehicles are in-line, such detent arrangements are subject to rapid wear. My prior U.S. Pat. No. 4,002,352 discloses a vehicle coupling utilizing both a friction brake and a detent arrangement for controlling swaying.

Towing and trailing vehicles not only undergo relative pivotal movement about an upright axis during turning, but also undergo relative angular movement about axes that extend longitudinally and crosswise of the vehicles, when traversing uneven ground. It is common practice to use ball and socket type couplers between the towing and trailing vehicle, to accommodate universal angular movement therebetween. However, prior anti-sway couplers using ball and socket type hitches, for example, as disclosed in the aforementioned U.S. Pat. Nos. 3,400,948 and 3,414,295. require a relatively complex arrangement for connecting the ball and socket coupler to the anti-sway brake. Moreover, prior vehicle anti-sway couplers were generally cumbersome to couple and uncouple.

SUMMARY OF THE INVENTION

An important object of this invention is to provide a vehicle coupling apparatus that will accommodate universal angular movement between the towing and trailing vehicles and control swaying of the trailing vehicle, and which is easy to couple and uncouple.

Another object of this invention is to provide a vehicle coupling apparatus that will accommodate universal angular movement between the towing and trailing vehicles and which has a friction type sway brake which maximizes the resistance to swaying of the vehicles when the vehicles are in-line, and which decreases the force resisting relative angular movement when the vehicles are executing a turn.

Another object of this invention is to provide a vehicle coupling apparatus in accordance with the aforegoing objects which is economical to construct and easy to install.

Accordingly, the present invention provides a coupling apparatus for interconnecting two vehicles for relative pivotal movement which comprises a hitch member adapted or attachment to a first vehicle and having a hitch ball adjacent its distal end, and a coupler member adapted for attachment to a second vehicle and having a head portion at its distal end defining a ball socket for detachably receiving the hitch ball. Friction type sway control means are provided which include a guide means mounted on the hitch member to extend horizontally and crosswise of the longitudinal centerline of the hitch member at a location spaced from the hitch ball, and a slide block having a notch in the side adjacent the hitch ball for receiving a nose on the head portion of the coupler and such that horizontal swaying movement of the coupler about the hitch ball causes sliding movement of the slide block along the guideway when the coupler swings horizontally in either direction from a position in which the longitudinal centerline of the coupler is aligned with the longitudinal centerline of the hitch member.

The guide means is mounted on the hitch member for limited norizontal movement relative to the hitch member in a direction paralleling the longitudinal centerline of the hitch member and the guide means is yieldably biased in a direction toward the hitch ball to press the slide block against the nose on the coupler. A selectively operable means is provided for positively shifting the guide means in a direction away from the hitch ball to facilitate coupling and uncoupling of the coupler from the hitch ball.

DETAILED DESCRIPTION

Figure 4:
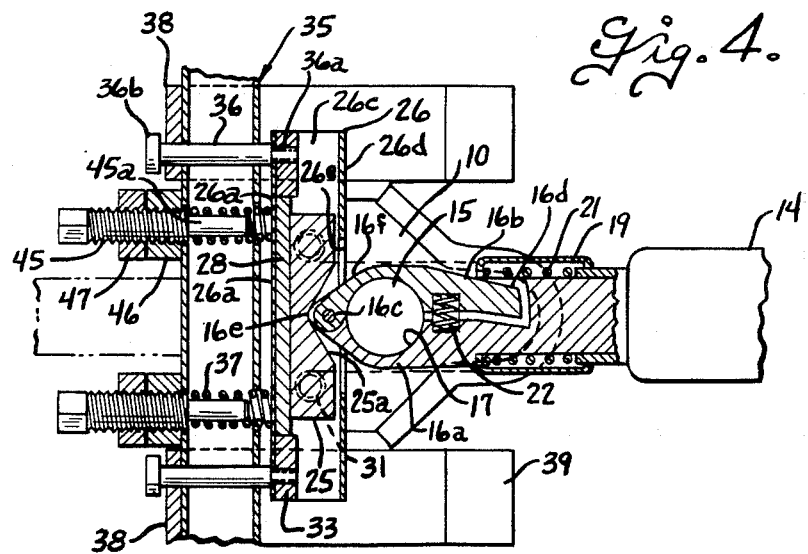
FIG. 4 is a fragmentary horizontal sectional view taken on the plane 4—4 of FIG. 2.

The coupling apparatus of the present invention is generally adapted for interconnecting two vehicles for relative pivotal movement and may be used for interconnecting a single towing vehicle to a trailing vehicle or utilized to interconnect a plurality of vehicles in a train, for example as shown in my prior U.S. Pat. No. 4,002,352. The coupling apparatus includes a hitch member 10 having a longitudinal centerline designated CH in FIG. 1, and which is adapted for attachment at one end to a first vehicle 13. The coupling apparatus also includes a coupler 11 having a longitudinal centerline designated CC in FIG. 1, and which is adapted for attachment at one end to a second vehicle 14. The coupling apparatus is of the ball and socket type and includes a hitch ball 15 mounted on the hitch member 10 at a location on the longitudinal centerline CH of the hitch member adjacent its distal end. The coupler 11 has a head portion 16 at its distal end defining a ball socket on the longitudinal centerline of the coupler for detachably receiving the hitch ball. The coupler is preferably of the type that includes a body 16a and a cap 16b that are hinged together as by a hinge pin 16c that extends through interfitting knuckles on the front of the head portion of the coupler, for example as shown in U.S. Pat. No. 4,157,190 to which reference is made for a more detailed description. In general, the body and cap are closable along parting faces and have internal recesses forming a ball receiving socket 17, when the cap is closed. A collar 19 is mounted for axial movement along the body portion 11 and has a front portion adapted to bear against a tapered surface 16d on the cap when the collar is in its forward position as shown in FIG. 4. A spring 21 yieldably biases the collar 19 to its forward or lock position. A spring 22 is commonly provided in recesses in the parting faces of the body and cap, to yieldably urge the cap to an open position when the collar 19 is retracted. The coupler is formed with a nose 16e that projects from the head portion of the coupler at the longitudinal centerline of the coupler, and which nose is spaced forwardly from the center of the socket 17 in the coupler a distance substantially greater than the radial spacing of the side of the coupler from the center of the socket. The head of the coupler has forward side faces 16f that diverge from the nose 16e and each side face is disposed at a shallow acute angle, for example about 35° relative to the centerline of the coupler.

A slide block 25 is mounted in a guide member 26 on the hitch member 10, for sliding movement along a horizontal path crosswise of the longitudinal centerline of the hitch member at a location spaced from the hitch ball. In the embodiment shown, the guide member 26 is in the form of a generally rectangular tube having an inner wall 26a, top and bottom walls 26b and 26c, and an outer side wall 26d. The top wall and outer side wall are cut away to provide an opening 26e to allow the nose portion 16e on the coupler to extend thereinto in all relative angular positions of the coupler and hitch member. The slide block 25 is mounted in the guide member for sliding movement therealong and has a V-shaped notch 25a in one side arranged to receive a nose portion 16e of the coupler. For reasons pointed out hereinafter, the side walls of the notch diverge relative to each other at a wide angle, for example of the order of 120°, and such that each side wall of the notch in the slide block diverges relative to the longitudinal centerline CH of the hitch member at an angle substantially greater than the angle between the centerline CC of the coupler and the side 16f of the nose portion. A brake pad 28 is disposed between the side of the slide block opposite the notch and the side wall 26a of the guide member, to frictionally retard movement of the slide block along the guide member. It is contemplated that any suitable brake material can be used for the brake pad and the brake material may, for example, be of a composition similar to that used in automobile brakes. Auxillary brake pads 31 are disposed in bores in the underside of the slide block and are yieldably biased by springs 32 downwardly into engagement with the bottom wall 26c of the guide member. The auxillary brake pads are arranged to provide a relatively light frictional resistance to movement of the slide block along the guideway sufficient to hold the slide block in position when the coupler is disconnected from the hitch ball. The brake pad 28 is confined between the top and bottom walls 26b and 26c of the guide member 26 and is constrained against endwise movement by stop blocks 33. The stop blocks are spaced from the ends of the slide block a distance to accommodate the maximum sliding movement of the slide block that occurs during angular movement of the coupler member relative to the hitch member, and yet prevent movement of the slide block completely out of the guide member.

Figure 2:
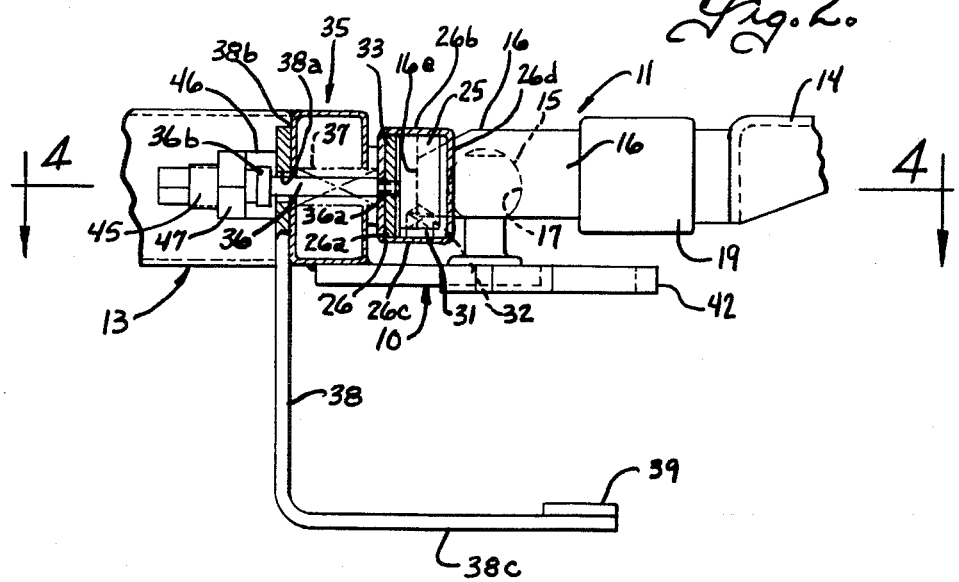
FIG. 2 is a fragmentary vertical sectional view taken on the plane 2—2 of FIG. 1.

The guide member 26 is mounted for limited movement relative to the hitch member in a direction paralleling the longitudinal centerline of the hitch member. For this purpose, a cross member 35 is fixed to the hitch member at a location spaced from the hitch ball 15 and extends crosswise of the longitudinal centerline of the hitch member. The cross member 35 may be a separate member attached to the end of one hitch member or a part of frame of the vehicle to which the hitch member is attached. In the embodiment shown, the cross member 35 is in the form of a tube of square cross section that is welded or otherwise secured to the hitch member 10 and extends upwardly therefrom at a location spaced from the hitch ball. Guide pins 36, are attached to the guide member 26 and extend through openings in the cross member at relatively opposite sides of the centerline CH of the hitch member for supporting the guide member for movement along a path paralleling the centerline of the hitch member. The guide pins 36 are conveniently in the form of bolts having a reduced diameter threaded end 36a tapped into the ends of the guide member 26 and into the stop blocks 33, as best shown in FIGS. 2 and 4. The guide pins 36 have heads 36b on their outer ends. Coil type compression springs 37 are provided to yieldably urge guide member in a direction toward the nose portion on the coupler and provision is made for adjusting the pressure exerted by the springs 37 on the guide member 26. As best shown in FIG. 4, bolts 45 are threadedly mounted in nuts 46 welded to the cross member 35. The springs 37 extend through openings in the cross member and one end of each adjusting bolt engages one end of the associated spring while the other end of the spring engages the guide member. The adjusting bolts 45 can be turned in the nuts 46 to adjust the pressure applied by springs to the guide member, and then locked in adjusted position by lock nuts 47. A reduced diameter shank 45a is provided on the end of the bolts 46 and arranged to extend into the associated springs 37 to center and guide the springs.

Figure 3:
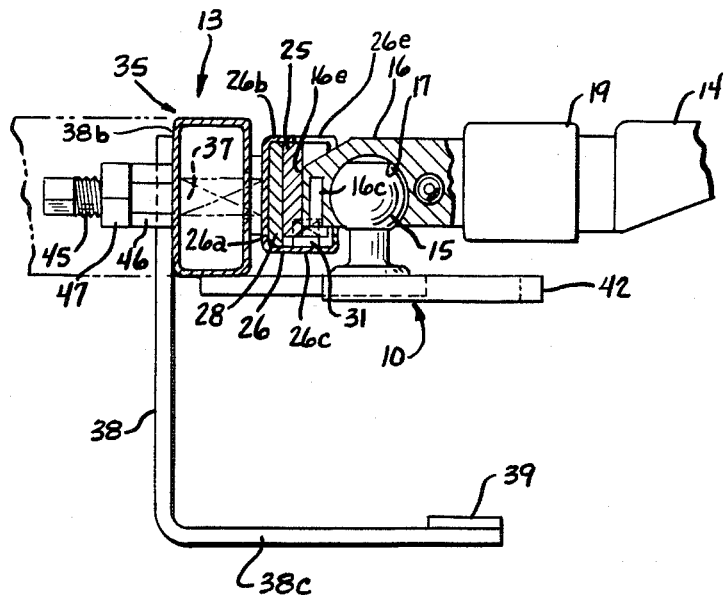
FIG. 3 is a fragmentary vertical sectional view taken on the plane 3—3 of FIG. 1.

An actuating lever 38 is provided for each of the pins 36 and each actuating lever has a vertically enlarged opening 38a (FIG. 2) for loosely receiving a respective one of the guide pins between the head 36b and the cross member 35. As best shown in FIGS. 2 and 3, the actuating levers 38 have a nose 38b at their upper ends arranged to engage the cross member. The actuating levers are conveniently arranged for operation by the foot of the operator and each have a leg 38c that extends rearwardly and underlies the hitch member 10 and terminates with a foot pad 39 at its rear end.

Figure 1:
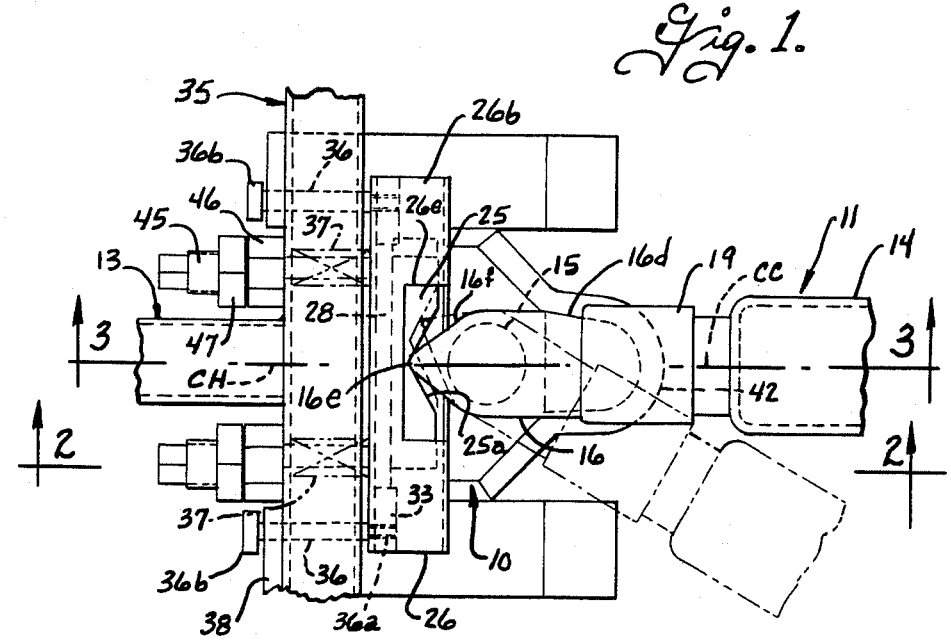
FIG. 1 is a plan view of vehicle coupling apparatus embodying the present invention.

The springs 37 are arranged to yieldably press the guide member 26 and slide block 25 against the nose on the coupler member. The length of the guide pins 36 is selected such that, when the coupler member is mounted on the hitch, the heads 36b on the pins 36 are spaced slightly from the associated actuating lever 38 as shown in FIGS. 1, 2 and 4. Thus, the springs 37 can yieldably press the slide block against the nose on the coupler to maintain the nose on the coupler in the notch in the slide block and also press the brake pad against the side of the slide block opposite the notch. The levers 38 can be depressed as by applying foot pressure to a foot pad 39 to cause the nose portion 38b on the upper ends of the lever to engage the cross member 35 and move the pins 36 in a direction to retract the guide member 26 and slide block 25 away from the hitch ball, to facilitate coupling and uncoupling of the coupler from the hitch ball. When the coupler is uncoupled from the hitch ball and the operating lever is released, the guide member 26 will move a short distance toward the hitch ball until the heads 36b on the pins engage the associated lever and moves it to a position in which it engages the cross member 32 at a location below the nose 38b, to stop rearward movement of the guide member. A loop member 42 is provided on the distal end of the hitch member, for receiving a safety chain or the like.

The hitch and coupler are shown in solid lines in FIG. 1 and in FIGS. 2-4 with the centerline CC of the coupler aligned with the centerline CH of the hitch member. When the coupler and hitch member are in their in-line position, the guide 26 is spring biased in a direction toward the hitch ball to press the notch in the slide block against the nose on the coupler member. As the coupler member swings horizontally about the ball from its in-line position relative to the hitch member, the nose 16e on the coupler member moves in an arcuate path and causes the slide block 25 to move along the guide member 26 at a rate that is a maximum when the centerline of the coupler is aligned with the centerline of the hitch member and decreases to zero when the centerline of the coupler is disposed substantially perpendicular to the face of the notch 25a in the slide block that is engaged by the nose 16e on the coupler. Accordingly, when the coupler member reaches a position such as shown in phantom lines in FIG. 1 in which the centerline CC of the coupler member is substantially perpendicular to the face 25a of the notch in the slide block that is engaged by the nose, then further angular movement of the coupler will not cause a corresponding movement of the slide block. Thus, the frictional retarding force imposed by the slide block and which resists angular movement of the coupler relative to the hitch member, is a maximum when the centerline of the coupler is aligned with the centerline of the hitch member and decreases as the angle between the coupler and hitch member increases and drops to substantially zero beyond a predetermined angle to allow free turning of the vehicles around relatively sharp corners. Preferably, the nose 16e on the coupler and notch 25a in the slide block are arranged to allow the coupler to turn to a position in which its centerline is at substantially 90° relative to the centerline of the hitch member, to enable the vehicles to turn very tight corners.

From the foregoing it is thought that the construction and operation of the coupling apparatus will be readily understood. The ball and socket type coupler allows universal angular movement between the vehicles connected by the coupler. The slide block is yieldably biased relative to the hitch member against the nose on the coupler, when the coupler is connected to the hitch ball. The anti-sway mechanism can accommodate limited angular movement between the coupler and hitch member about their longitudinal centerline and also limited angular movement between the coupler and hitch member about a horizontal axis crosswise of their centerlines, as occurs during movement of the vehicles over uneven terrain. The slide block 25 is moved along the guide member 6 in response to relative angular movement between the coupler and hitch member about the upright axis of the hitch ball, and the rate of sliding movement of the slide block is at a maximum when the coupler parts are aligned and decreases as the angle between the coupler parts increases. In this manner, the anti-sway mechanism frictionally resists swaying of the trailing vehicle relative to the towing vehicle with a force that is a maximum when the vehicle centerlines are aligned and decreases as the angle between the centerlines increases. The coupler and hitch and sway control mechanism can be easily disconnected by operating the levers 38 to force the slide blocks away from the nose on the coupler and by then retracting the locking sleeve 19 on the coupler to allow the coupler to be opened and lifted off the hitch ball. Recoupling of the parts is effected by retracting the guide member 26 and slide block 25 away from the hitch ball and then lowering the coupler onto the ball and locking the cap on the coupler in position. The auxiliary brake pads are arranged to retain the slide block in the position it was when the coupler is disconnected from the hitch ball, but the frictional restraining force of the auxiliary pads can be manually overcome to position the slide block at any desired position along guide block 26 to facilitate recoupling.

The embodiments of the invention in which an exclusive property or privilege is claimed are defined as follows:

1. A coupling apparatus for interconnecting two vehicles for relative pivotal movement comprising, a hitch member having a longitudinal centerline and adapted for attachment at one end to a first vehicle, a hitch ball extending upwardly from the hitch member at a location on its longitudinal centerline adjacent its distal end, a coupler having a longitudinal centerline and adapted for attachment at one end to a second vehicle, the coupler having a head portion at its distal end defining a ball socket on the longitudinal centerline of the coupler for detachably receiving the hitch ball, a nose projecting from the head portion of the coupler at the longitudinal centerline of the coupler, guide means defining a guideway, a slide block mounted on the guide means for movement along the guideway, friction brake means for frictionally retarding movement of the slide block along the guideway, means mounting the guide means to extend horizontally and crosswise of the longitudinal centerline of the hitch member at a location spaced from the hitch ball, the slide block having a notch in the side adjacent the hitch ball for receiving the nose on the coupler and such that horizontal swinging movement of the coupler about the hitch ball causes sliding movement of the slide block along the guideway when the coupler swings horizontally in either direction from a position in which the longitudinal centerline of the coupler is aligned with the longitudinal centerline of the hitch member.

2. A coupling apparatus according to claim 1 wherein said means for mounting the guide means is arranged to support the guide means for limited horizontal movement relative to the hitch member in a direction paralleling the longitudinal centerline of the hitch member, and means for yieldably biasing the guide means in a direction toward the hitch ball to press the slide block against the nose on the coupler.

3. A coupling apparatus according to claim 2 including selectively operable means for positively shifting the guide means in a direction away from the hitch ball to facilitate coupling and uncoupling of the coupler from the hitch ball.

4. A coupling apparatus according to claim 2 wherein the friction brake means is disposed at the side of the slide block opposite the notch.

5. A coupling apparatus for interconnecting two vehicles for relative pivotal movement comprising, a hitch member having a longitudinal centerline and adapted for attachment at one end to a first vehicle, a hitch ball extending upwardly from the hitch member at a location on its longitudinal centerline adjacent its distal end, a coupler having a longitudinal centerline and adapted for attachment at one end to a second vehicle, the coupler having a head portion at its distal end defining a ball socket on the longitudinal centerline of the coupler detachably engageable with the hitch ball, a nose projecting from the head portion of the coupler at the longitudinal centerline of the coupler, guide means defining a linear guideway, a slide block mounted on the guide means for movement along the guideway, friction brake means for frictionally retarding movement of the slide block along the guideway, means mounting the guide means to extend horizontally and crosswise of the longitudinal centerline of the hitch member at a location spaced from the hitch ball, the slide block having a notch in the side adjacent the hitch ball for receiving the nose on the coupler and such that horizontal swinging movement of the coupler about the hitch ball causes movement of the slide block along the guideway at a rate that is a maximum when the centerline of the coupler is aligned with the centerline of the hitch member and decreases to zero when the angle between the centerline of the coupler and the centerline of the hitch member reaches a preselected angle that is substantially less than 90°.

6. A coupling apparatus according to claim 5 wherein the notch in the slide block has an included angle of about 120°.

7. A coupling apparatus according to claim 5 wherein said means for mounting the guide means is arranged to support the guide means for limited horizontal movement relative to the hitch member in a direction paralleling the longitudinal centerline of the hitch member, and means for yieldably biasing the guide means in a direction toward the hitch ball to press the slide block against the nose on the coupler.

8. A coupling apparatus according to claim 7 including selectively operable means for positively shifting the guide means in a direction away from the hitch ball to facilitate coupling and uncoupling of the coupler from the hitch ball.

9. A coupling apparatus for interconnecting two vehicles for relative pivotal movement comprising, a hitch member having a longitudinal centerline and adapted for attachment at one end to a first vehicle, a hitch ball extending upwardly from the hitch member at a location on its longitudinal centerline adjacent its distal end, a coupler having a longitudinal centerline and adapted for attachment at one end to a second vehicle, the coupler having a head portion at its distal end defining a ball socket on the longitudinal centerline of the coupler for detachably receiving the hitch ball, a nose projecting from the head portion on the coupler at the longitudinal centerline of the coupler, a cross member fixed to said one end of the hitch member and extending crosswise of the longitudinal centerline of the hitch member, a pair of guide pins slidably mounted on the cross member for sliding movement along paths parallel to the longitudinal centerline of the hitch member, a guide member attached to the guide pins between the hitch ball and the cross member and defining a guideway extending crosswise of the longitudinal centerline of the hitch member, a slide block mounted on the guideway for linear movement relative thereto along a path perpendicular to the longitudinal centerline of the hitch member, the slide block having a notch in the side adjacent the hitch ball for receiving the nose on the head portion of the coupler such that horizontal swinging of the coupler about the hitch ball causes the slide block to move along the guideway, means yieldably biasing the guide member in a direction toward the hitch ball, and friction brake means between the slide block and guide member for retarding sliding of the slide block along the guideway.

10. A coupling apparatus according to claim 9 including lever means engaging the guide pins and operable to retract the guide pins in a direction away from the hitch ball to facilitate coupling and uncoupling of the coupler.

11. A coupling apparatus according to claim 10 wherein said friction brake means includes a brake pad disposed at the side of the slide block opposite the side having the notch.

12. A coupling apparatus according to claim 10 including auxiliary friction brake means between the slide block and guideway for inhibiting movement of the slide block along the guideway when the coupler is out of engagement with the slide block.

13. A coupling apparatus for interconnecting two vehicles for relative pivotal movement comprising, a hitch member having a longitudinal centerline and adapted for attachment at the end to a first vehicle, a hitch ball extending upwardly from the hitch member at a location on its longitudinal centerline adjacent its distal end, a coupler having a longitudinal centerline and adapted for attachment at one end to a second vehicle, the coupler having a head portion at its distal end defining a ball socket on the longitudinal centerline of the coupler for detachably receiving the hitch ball, a nose projecting from the head portion on the coupler at the longitudinal centerline of the coupler, a cross member fixed to said one end of the hitch member, sway dampening means including guide means mounted on said cross member for limited movement relative thereto in a direction paralleling the longitudinal centerline of the hitch member, a block mounted on said guide means for movement therewith toward and away from the hitch ball, said block having a V-shaped notch in one side for receiving the nose on the head of the coupler, means yieldably biasing the guide means in a direction toward the hitch ball to press the block against the nose on the coupler, and selectively operable means for positively shifting the guide means in a direction away from the hitch ball to facilitate coupling and uncoupling of the coupler from the ball.

* * * * *